No. 731,648. PATENTED JUNE 23, 1903.
W. P. YANCEY.
WHEEL.
APPLICATION FILED JULY 10, 1902.
NO MODEL.
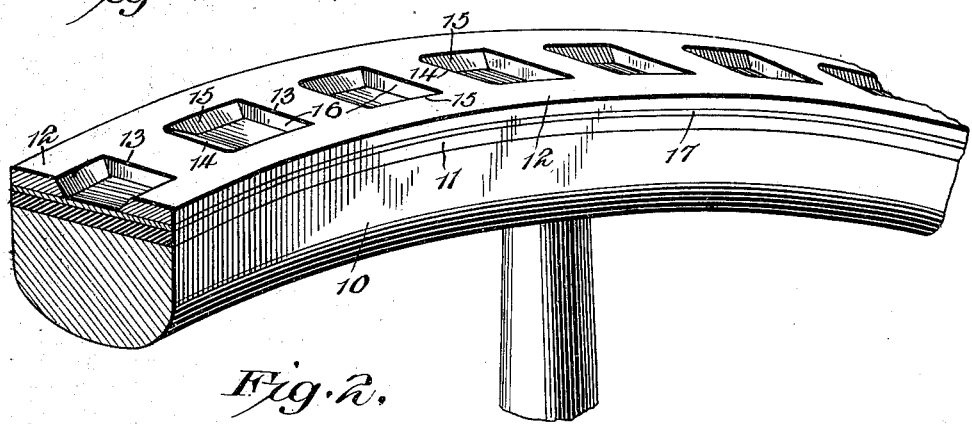
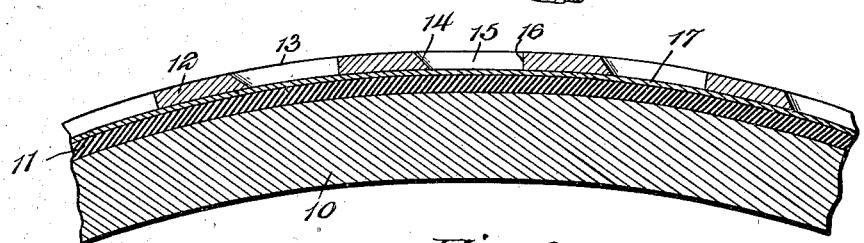
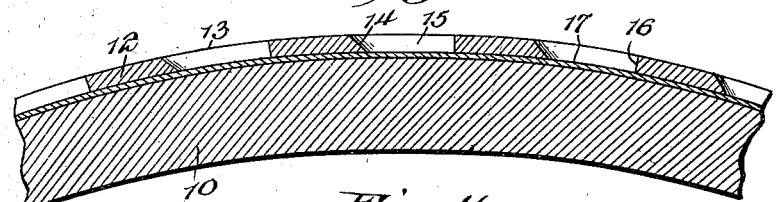
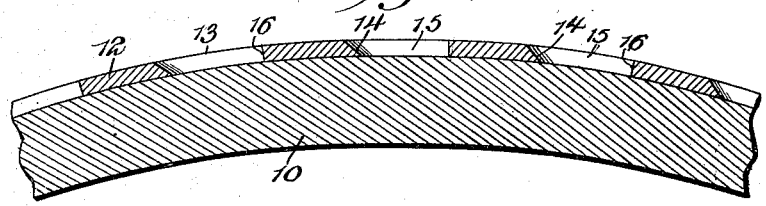
Witnesses
Howard D. Orr.
B. G. Foster.
William P. Yancey, Inventor,
By E. G. Siggers,
Attorney.
THE NORRIS PETERS CO., PHOTO-LITHO., WASHINGTON, D. C.

No. 731,648.

Patented June 23, 1903.

UNITED STATES PATENT OFFICE.

WILLIAM PAUL YANCEY, OF TAMPA, FLORIDA.

WHEEL.

SPECIFICATION forming part of Letters Patent No. 731,648, dated June 23, 1903

Application filed July 10, 1902. Serial No. 115,041. (No model.)

*To all whom it may concern:*

Be it known that I, WILLIAM PAUL YANCEY, a citizen of the United States, residing at Tampa, in the county of Hillsboro and State of Florida, have invented a new and useful Wheel, of which the following is a specification.

The present invention relates to wheels, particularly for self-propelled vehicles, though useful upon bicycles, tricycles, and indeed upon all kinds of vehicles, as will appear in the following specification.

The object thereof is to provide an improved structure which will run smoothly over a paved street or unpaved roadway and when upon a soft or sandy road will not sink deeply into the same, but will have an engagement therewith to prevent slipping.

The invention will be readily understood upon reference to the accompanying drawings, taken in connection with the following specification, and it will be noted that the invention is open to various changes.

In the drawings, Figure 1 is a perspective view of a small portion of a vehicle-wheel constructed in accordance with the present invention. Fig. 2 is a longitudinal sectional view through the same. Figs. 3 and 4 are sectional views showing slightly-modified forms of construction.

Similar numerals of reference designate corresponding parts in all the figures of the drawings.

As the invention relates to the rim of the wheel, the views have been limited to portions of the same which it is believed sufficiently illustrate the arrangement. In the construction illustrated in the first two figures this rim is made up of a felly 10, upon which is placed a cushion of compressible material 11, preferably composed of rubber. Over this is placed a metallic tire 12, said tire having openings 13 therein. These openings are preferably rectangular in form, one of the end and both side walls 14 and 15, respectively, being disposed in convergent relation. The other end wall 16 is not so arranged, but is preferably disposed at substantially right angles to the face of the tire, as clearly shown in Fig. 2. In the preferred form the opening 13 extends entirely through the tire, and in order to prevent the wear upon the portions of the rim beneath the same a plate or strip 17 is interposed between the tire and the cushion 11, said plate or strip being formed of suitable metal.

In Fig. 3 a slightly-modified form of rim is shown. In this instance the construction is exactly the same, with the exception of the cushion 11, which is dispensed with. This form may be substituted for the above-described structure when desired. In like manner the wear-strip 17 may be omitted, as shown in Fig. 4.

As a result of the arrangement it will be seen that the outer face of the tire is smooth, so that the wheel will travel over a pavement without injuring the same in any manner. Furthermore, when running over a soft or sandy road the wheel if broad enough will only sink into the same a depth equal to the thickness of the tire, because of the additional bearing-surface afforded by the bottoms of the openings or sockets, said bottoms being formed by the wear-plate, which closes the inner ends of said openings. Further than this, the tire as it comes down upon the sand or soft earth does not tend to displace it to the sides of the rim, as in the ordinary tire, for it incloses a considerable portion, thereby preventing the same being pushed to one side. As this inclosed earth cannot escape in either direction while the weight of the wheel is thereon, it must necessarily assist in supporting the wheel and preventing its sinking into the road. As a result the wheel will not slip because of the soil engaging in the sockets. The tapering construction of the walls of the openings is also advantageous, as it permits the earth to readily drop from the same, and thus prevent clogging. At the same time the right-angularly-disposed walls 16 constitute shoulders that will more securely prevent slipping, these shoulders being so arranged that they will constitute the front walls of the sockets when the wheel is running. The interposed cushion will to a great extent absorb the shocks and jars, though, as already stated, this may be dispensed with when so desired.

The term "rim" as used in the specification and claims is intended to designate the peripheral portion of the wheel as a whole, and said rim therefore may be of one piece or made up of several distinct elements, including the tire, felly, &c., as shown in the several figures.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention. For instance, the rim and tire might be formed integral and the sockets cut in the outer face of the same.

Having thus described my invention, what I claim as new, and desire to secure by Letters Patent, is—

1. In a wheel, the combination with a felly portion having a flat outer face, of a flat metallic tire surrounding the felly portion and having openings therethrough, said felly portion completely closing the inner ends of the openings.

2. In a wheel, the combination with a felly, of a tire surrounding the felly and having openings therethrough, and a wear-plate interposed between the felly and tire and closing the inner ends of the openings through the latter.

3. In a wheel, the combination with a felly, of a tire surrounding the felly and having openings therethrough, a wear-plate arranged beneath the felly and closing the inner ends of the openings, and a compressible cushion interposed between the felly and wear-plate.

4. In a wheel, a rim having sockets in its outer face, said sockets each having portions of its walls arranged in convergent relation, and a transversely-disposed portion that does not converge, the latter portion constituting a shoulder, the smaller ends of the sockets being innermost to permit the accumulated dirt dropping outwardly.

5. In a wheel, a rim having rectangular sockets in its outer face, certain portions of the walls of each socket being disposed in convergent relation, the remaining portion which is transversely disposed to the rim constituting an antislipping shoulder, the smaller ends of the sockets being innermost to permit the accumulated dirt dropping outwardly.

6. In a wheel, a rim having rectangular sockets in its outer face, three sides of each socket being disposed in convergent relation, the remaining side being arranged transversely of and at substantially right angles to the outer face of the rim and constituting a bearing-shoulder, the smaller ends of the sockets being innermost to permit the accumulated dirt dropping outwardly.

In testimony that I claim the foregoing as my own I have hereto affixed my signature in the presence of two witnesses.

WILLIAM PAUL YANCEY.

Witnesses:
N. DIXON,
W. B. NEWKIRK.